(No Model.)
F. S. YOUNGMAN.
SUPPORT FOR BICYCLE SHADES.
No. 594,057. Patented Nov. 23, 1897.
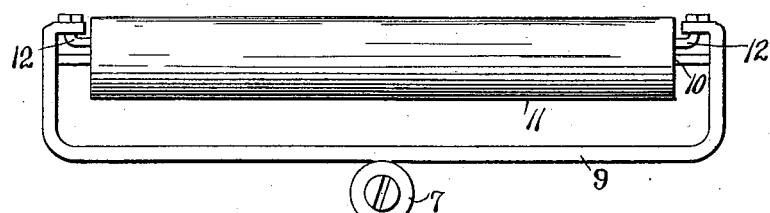
Fig. 1.
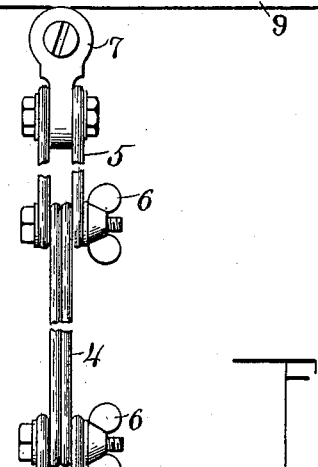
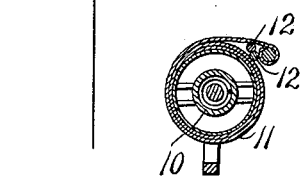
Fig. 3.
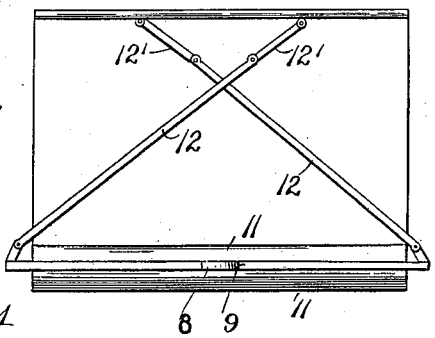
Fig. 4.
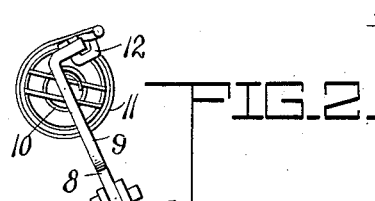
Fig. 2.
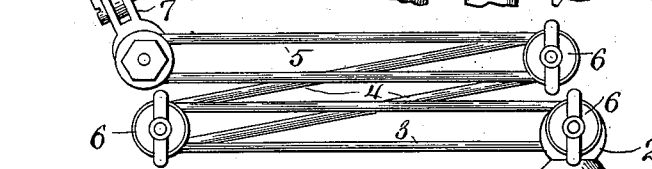
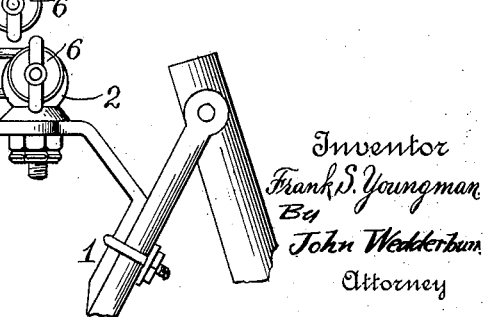
Witnesses
W. E. Allen
Victor J. Evans
Inventor
Frank S. Youngman
By John Wedderburn
Attorney

UNITED STATES PATENT OFFICE.

FRANK S. YOUNGMAN, OF DIXON, ILLINOIS.

SUPPORT FOR BICYCLE-SHADES.

SPECIFICATION forming part of Letters Patent No. 594,057, dated November 23, 1897.

Application filed April 24, 1897. Serial No. 633,561. (No model.)

*To all whom it may concern:*

Be it known that I, FRANK S. YOUNGMAN, a citizen of the United States, residing at Dixon, in the county of Lee and State of Illinois, have invented certain new and useful Improvements in Bicycle-Shades; and I do hereby declare the following to be a full, clear, and exact description of the invention, such as will enable others skilled in the art to which it appertains to make and use the same.

This invention relates to a shade attachment for bicycles; and it consists, essentially, of an adjustable folding support carrying a shade which is adapted to be rolled into compact form and the whole device conveniently arranged in rear of the seat of the rider when not in use.

The invention further consists of the construction and arrangement of the several parts which will be more fully hereinafter described and claimed.

The object of the invention is to provide an adjustable attachment of the character set forth which can be readily set up for use or folded and conveniently carried in connection with the bicycle, the parts being simple and effective in their construction and operation, strong and durable, easily and readily handled and placed in operative position, and comparatively inexpensive in the cost of manufacture.

In the accompanying drawings, Figure 1 is a rear elevation of a part of a bicycle, showing the improved attachment applied in operative position thereon. Fig. 2 is a side elevation of the device shown folded. Fig. 3 is a sectional view of the shade roller and yoke, showing the shade rolled upon its support. Fig. 4 is a bottom plan view of the shade and its attachments.

Referring to the accompanying drawings, wherein similar numerals of reference are employed to indicate corresponding parts in the several views, the numeral 1 designates a clamp adapted to be applied to the frame of a bicycle in the rear of the seat and having projecting therefrom an arm 2, to the outer end of which is movably attached a standard-section 3, having in turn adjustably connected thereto and to each other standard-sections 4 and 5, with pivotal joints formed between the arm 2 and the standard-section, being controlled by clamping-screws 6 to hold the said standards in adjustable upright position. All of the sections are composed of pairs of open wire links and have their ends engaged by said clamping-screws. The sections 4 and 5 are adapted to fold upon the section 3 and the latter turn on the arm 2 when the parts are arranged as shown in Fig. 2, and on the upper end of section 5 is a pivot-head 7, to which an ear 8, carried at the center of a yoke 9, is adjustably secured, so that the said yoke and the parts carried thereby can be adjusted to turn the shade to either side of the rider or throw the said yoke backwardly on the standard when not in use or arranged for folding. The yoke 9 embraces a spring-roller 10 of ordinary form of construction and on which is mounted a shade 11, and from the said yoke also movably extends upper arms 12 to support the shade 11 when the latter is distended, as shown in Fig. 4.

The attachment heretofore set forth is especially intended for application to ladies' bicycles, but it can be used on any other machines to which it may be found applicable.

The device as an entirety can be suitably ornamented and the shade 11 formed of material having a pleasing design. The arms 12 extend inwardly across each other under the shade and have links 12' attached thereto and to the outer portion of the said shade to accommodate folding of the latter.

The said shade may have depending therefrom, if so desired, a suitable ornamental fringe or other analogous trimming, and it is obviously apparent that many minor changes in the construction and arrangement of the several parts might be made and substituted for those shown and described without in the least departing from the nature or spirit of the invention.

Having thus described the invention, what is claimed as new is—

In a bicycle attachment the combination of a standard having a yoke movably mounted on the upper end thereof, a spring-roller embraced by said yoke, the latter having folding arms movably attached thereto, and a shade adjustably engaging the said roller and supported by the said arms, substantially as, and for the purposes specified.

In testimony whereof I have signed this specification in the presence of two subscribing witnesses.

FRANK S. YOUNGMAN.

Witnesses:
FRANK WHEELER,
ALEXANDER DEPUY.